(12) United States Patent
Spinelli

(10) Patent No.: US 8,897,931 B2
(45) Date of Patent: Nov. 25, 2014

(54) FLIGHT INTERPRETER FOR CAPTIVE CARRY UNMANNED AIRCRAFT SYSTEMS DEMONSTRATION

(75) Inventor: Charles B. Spinelli, Bainbridge Island, WA (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 13/196,826

(22) Filed: Aug. 2, 2011

(65) Prior Publication Data

US 2013/0035805 A1 Feb. 7, 2013

(51) Int. Cl.
G05D 1/00 (2006.01)
G01M 9/00 (2006.01)
G05D 1/10 (2006.01)

(52) U.S. Cl.
CPC ............... *G05D 1/104* (2013.01); *G01M 9/00* (2013.01); *G05D 1/0061* (2013.01)
USPC ........ 701/3; 434/28; 434/29; 434/31; 434/33; 434/47

(58) Field of Classification Search
CPC ..... G05D 1/104; G05D 1/0061; G05D 1/102; G05D 1/0858; G05D 1/12; B64C 29/0025; B64C 39/024; B64C 13/18; B64C 13/50; G09B 9/08; G09B 9/44; F41G 7/301; G06T 15/40
USPC ............... 701/2, 3, 11, 466; 169/47; 455/431; 244/12.3, 36, 50, 76 R, 177, 190, 194, 244/3.11; 382/100; 434/38; 345/428
See application file for complete search history.

(56) References Cited

U.S. PATENT DOCUMENTS

| 4,775,116 | A  | * | 10/1988 | Klein ........................... 244/76 R |
| 5,616,030 | A  | * | 4/1997 | Watson ........................... 434/38 |
| 5,890,441 | A  | * | 4/1999 | Swinson et al. ............. 244/12.3 |
| 6,364,026 | B1 | * | 4/2002 | Doshay ............................ 169/47 |
| H2099 | H  | * | 4/2004 | Heydlauff et al. ............. 382/100 |
| 7,130,741 | B2 | * | 10/2006 | Bodin et al. ...................... 701/2 |

(Continued)

FOREIGN PATENT DOCUMENTS

WO 2006075158 A1 7/2006

OTHER PUBLICATIONS

Degarmo, Matthew et al. "Prospective Unmanned Aerial Vehicle Operations in the Future National Airspace System" American Institute of Aeronautics and Astronautics, 2004.

(Continued)

*Primary Examiner* — Tuan C. To
*Assistant Examiner* — Yuri Kan
(74) *Attorney, Agent, or Firm* — Felix L. Fischer

(57) ABSTRACT

A system for unmanned aircraft system (UAS) testing which incorporates a UAS flight control system and an optionally piloted vehicle (OPV) carrying the UAS flight control system. The OPV has an OPV flight control system and a flight control interpreter (FCI) which receives input from the UAS flight control system representing control parameters for a flight profile of the UAS. The FCI provides status commands as an output to the OPV flight control system to replicate the flight profile. These status commands are selected from the group consisting of data regarding attitude, vertical navigation, lateral navigation, turn rate, velocity and engine operations. The OPV flight control system includes a pilot override for emergency, flight safety or other contingencies allowing an on board pilot to assume control of the OPV.

18 Claims, 6 Drawing Sheets

(56) References Cited

U.S. PATENT DOCUMENTS

| | | | |
|---|---|---|---|
| 7,158,877 B2* | 1/2007 | Carlsson et al. | 701/2 |
| 7,769,376 B2* | 8/2010 | Wright et al. | 455/431 |
| 7,793,884 B2* | 9/2010 | Dizdarevic et al. | 244/36 |
| 8,146,855 B2* | 4/2012 | Ismailov | 244/49 |
| 2002/0030142 A1* | 3/2002 | James | 244/194 |
| 2003/0085896 A1* | 5/2003 | Freeman | 345/428 |
| 2004/0155142 A1* | 8/2004 | Muravez | 244/3.11 |
| 2007/0023582 A1* | 2/2007 | Steele et al. | 244/190 |
| 2007/0050101 A1* | 3/2007 | Sacle et al. | 701/11 |
| 2007/0067145 A1* | 3/2007 | Miller et al. | 703/6 |
| 2007/0228221 A1* | 10/2007 | Segal | 244/177 |
| 2009/0222148 A1 | 9/2009 | Knotts | |
| 2010/0332054 A1* | 12/2010 | Brandao et al. | 701/3 |
| 2011/0035149 A1* | 2/2011 | McAndrew et al. | 701/205 |
| 2011/0264307 A1* | 10/2011 | Guyette et al. | 701/3 |
| 2012/0018574 A1* | 1/2012 | Bayer | 244/50 |

OTHER PUBLICATIONS

Ravich, T.M. "The Integration of Unmanned Aerial Vehicles Into the National Airspace", North Dakota law review. 85, No. 3, (2009): 597-622.

Sayer, Gerald R. "Operation of UAS in the Non-segregated NAS" Jun. 2009.

Curtin, Tom et al. "Project on Unmanned Aircraft in the NAS", Final Review Panel Meeting, Carnegie Mellon, May 2007.

"UAS in the NAS" Aviation Today, Jun. 14, 2010 available at http://www.aviationtoday.com/regions/usa/UAS-in-the-NAS__68744.html.

Center for Interdisciplinary Remotely-Piloted Aircraft Studies; "Pelican", Naval Postgraduate School, Monterey, California, XP002721646, 2011.

* cited by examiner

BOEING LITTLE BIRD

MODIFIED CESSNA 337 SKYMASTER

RUTAN CANARD VARIANT

DIAMOND AIRCRAFT DA-20

FLIGHT INTERPRETER FOR CAPTIVE CARRY UNMANNED AIRCRAFT SYSTEMS DEMONSTRATION

REFERENCE TO RELATED APPLICATIONS

This application is co-pending with application Ser. No. 13/196,844 entitled Enhanced Delectability of Air Vehicles for Optimal Operations in Controlled Airspace and application Ser. No. 13/196,855 entitled Method and System to Autonomously Direct Aircraft to Emergency/Contingency Landing Sites Using On-board Sensors filed substantially concurrently herewith both having a common assignee with the present application, the disclosures of which are incorporated herein by reference.

BACKGROUND INFORMATION

1. Field

Embodiments of the disclosure relate generally to the field of controlled flight for unmanned aircraft systems and more particularly to a system and method for the control of an Unmanned Aircraft System (UAS) in the National Airspace via a Captive Carry Surrogate UAS mounted on an Optionally Piloted Vehicle (OPV) wherein the system passes control from linked commands through the Flight Control System (FCS) of the UAS to the OPV via a Flight Control Interpreter (FCI).

2. Background

UAS are becoming widespread in the aviation world, but no existing procedures have been created to allow them to fly in the NAS with all other types of aircraft. This is partly due to the different mission profiles of UAS, some invalidated operational concepts, and the current lack of modernization of the NAS. Such modernization is planned in approximately the next 10 years.

As such, testing of UAS technologies and sensors is not easily accomplished and is expensive since it is very difficult to achieve permission to demonstrate new capabilities; such as participating in modern civil exercises over populated areas. Furthermore, the FAA imposes severe restrictions on flight operations of UAS within the NAS. Authorization for UAS flight operations may be granted by the FAA, but only on a case by case basis and only given an FAA approval for issuance of a Certificate of Authorization (COA) which must be applied for and. granted for each individual flight operation. The issuance of a COA is typically very difficult to obtain, takes a long period of time and in many cases is denied altogether. These FAA restrictions, while clearly imposed in the interest of maintaining safe flight operations in the NAS. severely impede development, test, and training efforts for the rapidly evolving family of UAS aircraft.

The currently accepted practice for UAS operations in the NAS is to request the COA and then conduct the limited flight allowable operation within the restrictions imposed. This approach adversely impacts development, testing, and training for UAS technologies by adding significantly to program cost and schedule.

It is therefore desirable to provide capability to demonstrate safely, efficiently and at low cost the ability for UASs to operate in the NAS.

SUMMARY

Embodiments described herein provide a system for unmanned aircraft system (UAS) testing which incorporates a UAS flight control system and an optionally piloted vehicle (OPV) carrying the UAS flight control system. The OPV has an OPV flight control system and a flight control interpreter (FCI) which receives input from the UAS flight control system representing control parameters for a flight profile of the UAS. The FCI provides status commands as an output to the OPV flight control system to replicate the flight profile. The OPV flight control system includes a pilot override for emergency, flight safety or other contingencies allowing an on board pilot to assume control of the OPV to which the UAS is attached, Advantageously, the OPV flight control system may be used to evaluate and help achieve NAS improvements such as: 4D trajectories, reduced air/ground communications, creating airspace sectors to better balance controller workload, establishing limited "dynamic resectorization", shared FAA/ user flight plan and situational awareness information, and better dissemination of common weather information to Federal Aviation Administration (FAA) and user facilities.

The UAS and OPV can be included in a UAS Captive Carry test system with at least a LAS fuselage having the UAS flight control system mounted on the OPV. The OPV having an OPV flight control system with a pilot override carries the UAS fuselage and a flight control interpreter (FCI) which receives control parameters from the UAS flight control system. The FCI provides status commands to the OPV flight control system to replicate a UAS flight profile which is then tracked. by an OPV ground monitor.

The embodiments described provide a method for testing of an unmanned aircraft system (UAS) in the national airspace (NAS) in which at least a UAS fuselage having a UAS flight control system is attached to an OPV having an OPV flight control system with a pilot override. The LAS flight control system is interconnected to an FCI which is interconnected to the OPV flight control system. A UAS flight profile is initiated and control parameters from the UAS flight control system are provided to the FCI. The control parameters are interpreted in the FCI. A determination is made if the profile is complete and, if not, status commands are output from the FCI to the OPV control system. Presence of a pilot override command is determined, and if one is not present, the OPV is then controlled based on the status commands.

The features, functions, and advantages that have been discussed can be achieved independently in various embodiments of the present invention or may be combined in yet other embodiments, further details of which can be seen with reference to the following description and drawings.

DETAILED DESCRIPTION

The embodiments described herein provide a test environment that would be compliant with FAA rules for manned aircraft operating within the NAS. A UAS airframe, payload, and avionics are mounted on or in an Optionally Piloted Vehicle (OPV). Since the OPV has a pilot on board the aircraft it is compliant with FAA requirements for flight within the NAS. During UAS testing, control of the OPV is driven by commands issued by a control law computer to mimic UAS flight characteristics. In this manner, the OPV is capable of emulating the kinematic flight profile of the UAS. If an anomaly were to occur during the test flight, control of the OPV would immediately transition to control by the safety pilot who would then operate the OPV aircraft manually under NAS flight rules. A flight interpreter functions to interpret flight commands to and from the UAS to the OPV. The OPV may be employed for testing of a UAS in planned NAS improvements including: 4D trajectories, reduced air/ground communications, creating airspace sectors to better balance controller workload, establishing limited "dynamic resectorization", shared FAA/user flight plan and situational awareness information, and better dissemination of common weather information to Federal Aviation Administration (FAA) and user facilities.

Figure 1:
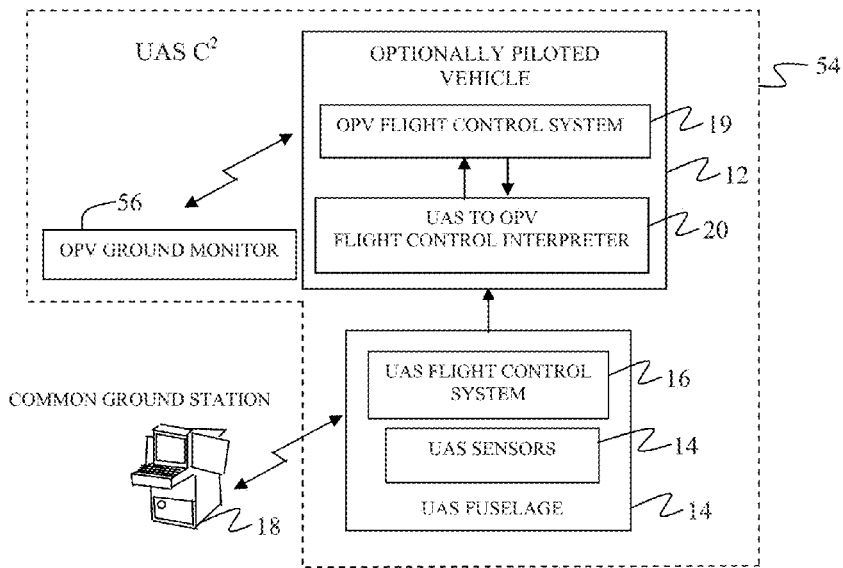
FIG. 1 is a block diagram of the system elements for an example embodiment.

As represented in FIG. 1, the operation and control elements of the UAS, which may be a complete fuselage 10 or in certain embodiments the complete UAS, is carried by the OPV 12. The UAS fuselage incorporates the UAS sensors 14 and the UAS flight control system 16 and communicates with a common ground station 18 employing command and control software such as Insitu's Multiple UAS Software Environment (I-MUSE) produced by Insitu, Inc. 118 East Columbia River Way, Bingen, Wash. 98605. In intended autonomous operation of the complete UAS, the UAS flight control system 16 would control the flight path of the UAS receiving flight control information from the common ground station with the UAS sensors providing mission information to the common ground station. In certain phases of flight operations, the UAS flight control system may operate in a preprogrammed mode independently from the common ground station and merely transmit flight status information and sensor data.

The OPV 12 includes a flight control system 19 which controls the operation of the OPV including an autopilot system for conventional flight path control of the OPV. The OPV is selected or designed with a flight envelope that encompasses the flight envelope of the UAS for the ability to provide flight characteristics comparable to those of the autonomous UAS. A UAS to OPV flight control interpreter (FCI) 20 is connected for input from the UAS flight control system 16 with output to the OPV flight control system 19.

Figure 2:
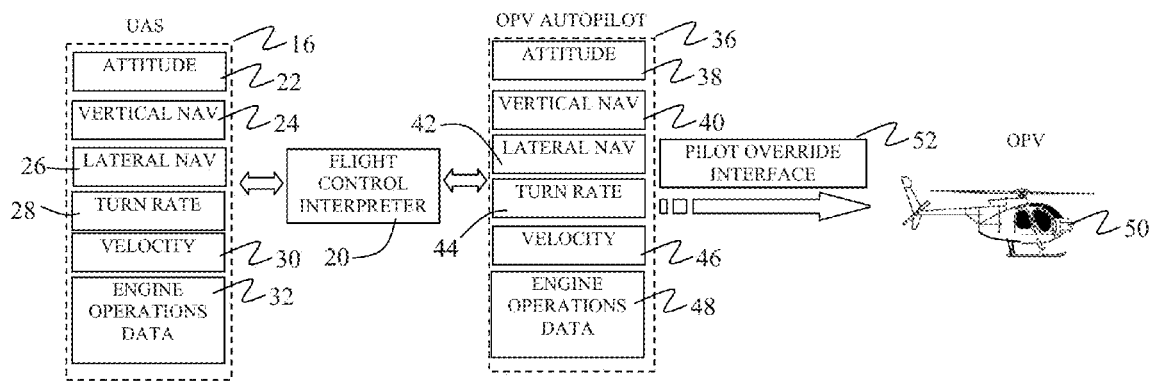
FIG. 2 is a block diagram of operational concept information flow for the example embodiment of the system.

FIG. 2 shows the operational concept information flow for an example embodiment of the system. The UAS flight control system 16 for the disclosed embodiment provides six key control parameters as inputs to the FCI 20; attitude data 22, vertical navigation data 24, lateral navigation data 26, turn rate data 28, velocity data 30, and engine operations data 32 (such as RPM). The input data are interpreted by the FCI and converted to status commands interpretable by OPV autopilot 36 to achieve a flight profile replicating or mimicking the profile that would be executed by the UAS alone. The autopilot 36 then employs the status commands, attitude 38, vertical navigation 40, lateral navigation 42, turn rate 44, velocity 46, and engine operations 48 to control the flight control surfaces of the OPV (represented by the OPV itself as element 50) to achieve that flight profile. A pilot override interface 52 allows the FCI commands to be overridden by direct control from the human pilot.

Unless interrupted by the pilot override interface 52, the OPV will operate with a flight profile and flight kinematics identical to the UAS, allowing both control of the UAS and the mission profile to be evaluated. Returning to FIG. 1, a UAS Captive Carry (UAS $C^2$) test bed 54, including the OPV 12 and an OPV Ground Monitor System 56 operating independently of the UAS common ground station 18, provides capability to closely replicate the avionics and flight kinematics of UAS test articles, provides a user transparent operational interface to the UAS presenting a comprehensive test environment nearly identical to that which would be experienced by an actual UAS flight, and provides a UAS pilot training environment that could be implemented regionally as required by candidate user agencies and institutions. Programmatic advantages include cost savings from not having to use expensive test ranges, ability to bypass expensive qualification processes for flight hardware, and elimination of potential loss of the UAS during test, The UAS $C^2$ test bed can provide a system for certifying UAS systems and their hardware, Furthermore, the UAS $C^2$ test bed has the potential for limited operational capability which could provide for advanced, state-of-the-art UAS sensor technologies to be rapidly employed on an ad-hoc basis in special need cases such as MIS exercises, search and rescue operations, and national emergencies such as the recent oil spill disaster in the gulf region.

The UAS captive carry test bed employs the Optionally Piloted Vehicle (OPV) to demonstrate operation of a UAS to the satisfaction of the FAA in terms of safety of flight, and integration with the latest NAS technologies such as 4D trajectories. In an example embodiment, the UAS fuselage is mounted to the OPV with sensors onboard and the wings and engine removed. In other embodiments the entire UAS or merely the sensor and control elements of the UAS may be mounted to the OPV. Commands are sent by the FCI to the OPV control law computer in the autopilot 36 to mimic UAS flight characteristics. Thus, the actual flight control of the OPV is totally transparent to operator at the common ground station 18. In case of emergency, flight safety issue or other contingency, a pilot on board the OPV is in communications with ATC and UAS operators and can take command of the OPV at anytime through the pilot override interface 52.

Figure 3:
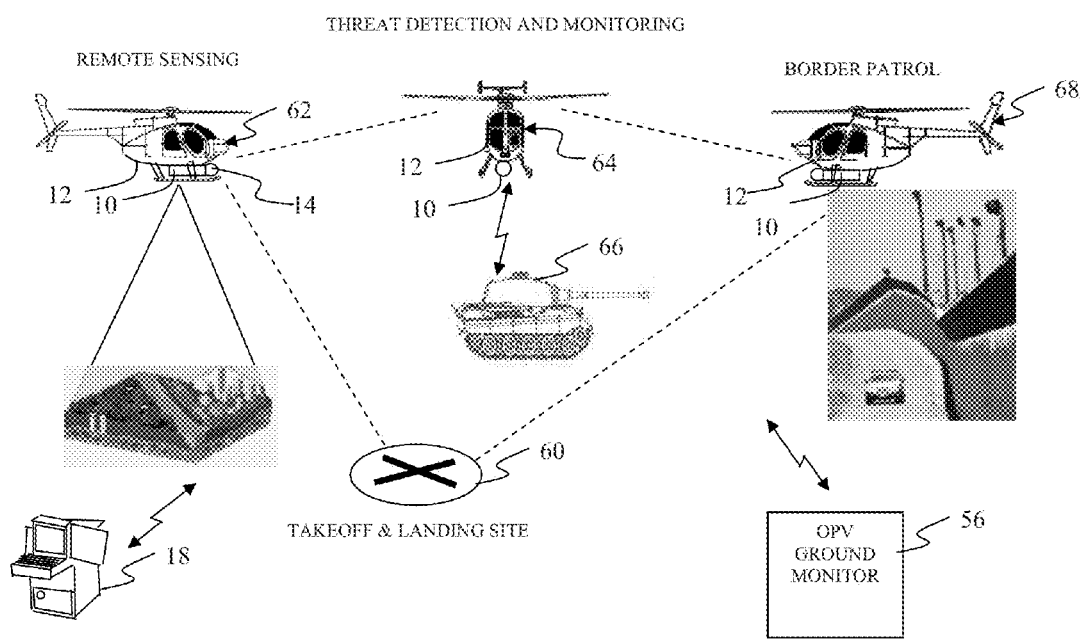
FIG. 3 is a flow diagram of an example operational profile of the system.

As shown in FIG. 3, a complete suite of operational testing for the UAS can be accomplished by UAS Captive Carry Test bed employing the OPV. Under control of the common ground station 18 or under autonomous preprogrammed control in the UAS itself monitored by the common ground station, the OPV 12 with UAS 10 attached departs from takeoff & landing site 60 (e.g., airport or alternative recovery airport) operating in a profile to conduct remote sensing using the UAS sensors 14 at a first location 62, transitioning to a second location 64 for threat detection and monitoring of actual or simulated threats such as tanks 66 or other devices such as radar or ground to air missiles. The OPV can then transition to a third location 68 for actual or simulated boarder patrol again employing the UAS sensors. The OPV then returns to the takeoff & landing site 60 for landing (or an alternative recovery airport). The entire operation is independently monitored by the OPV ground monitor system 56. The UAS Captive Carry Test bed can be employed in similar scenarios for: 1) deploying UAS in the NAS without a certificate of authorization from the FAA; 2) demonstrating UAS products over populated areas; 3) Sense and Avoid technology—test, evaluation and verification; 4) Safe Area Flight Emergency (SAFE)—test, evaluation and verification as described in copending application Ser. No. 13/196,855 entitled Method and System to Autonomously Direct Aircraft to Emergency/Contingency Landing Sites using On-board Sensors 5) Developing control operations (CONOPS) for the different mission scenarios; 6) New UAS sensor technology testing, and, 7) Demonstrating ad hoc data communications networks on UAS, Various configurations of air vehicles may be employed for the OPV in the UAS $C^2$ test bed as shown in FIGS. 4A-4D. A first OPV configuration is a helicopter such as the Boeing Little Bird 70 shown in FIG. 4A. This vehicle type allows a wide range of operational speeds to accommodate slower flying UAS simulation or simulation of a rotorcraft or VTOL UAS with hover capability. In one example, munitions may be fired, for instance, missile or weapons testing can be performed, using slow a tack as well as fast attack speeds without the requirement of an operator. Thus, this independent operational OPV configuration, which may be preprogrammed in one or more stages or plans, provides improved safety by eliminating the requirement of an operator. As such, this configuration results it less exposure of an operator to dangers of aggressive attack pattern testability. Furthermore, in yet another example, for people or land terrain intelligence gathering or recognizance missions, aggressive lateral as well as vertical acceleration and. roll configurations may be performed near fixed or moving structures or other moving objects or aircraft without sacrificing safety of an operator and such testing patterns would not be possible with many conventional unmanned aircraft.

Figure 4A:
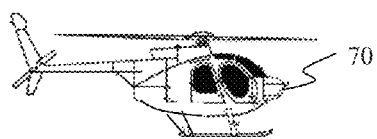
FIGS. 4A-4D are example OPV platforms for use in embodiments of the system.
Figure 4B:
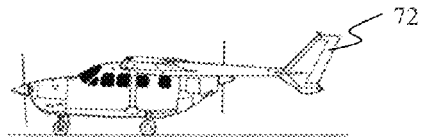
Figure 4C:
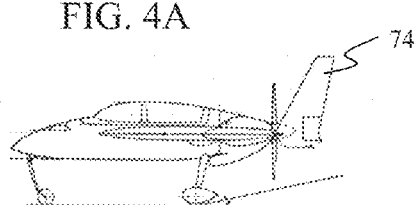
Figure 4D:
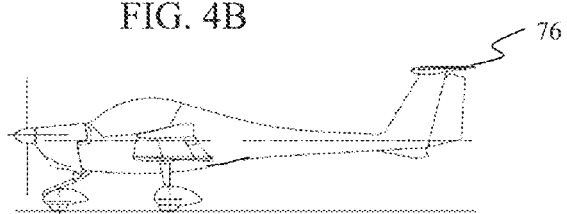

In other configurations, a conventional general aviation aircraft such as a Cessna SkyMaster 72 (Cessna model C337 or USAF O-2) shown in FIG. 4B may be employed for larger UAS vehicles having higher airspeeds and/or payload. requirements. In other variants, alternative OPVs for smaller UAS may included on vehicles such as a canard variant 74 based on aircraft designs by Burt Rutan such as the Rutan Canard Variant (e.g., VariEze or LongEze), shown in FIG. 4C or the Diamond Aircraft DA-20 76 shown in FIG. 4D. Advantageously, in these conventional general aviation examples, various takeoff and landing speeds and attack angles may be utilized to generate plots of aircraft performance characteristics during an operational life-span so that an operator remotely controls the UAS vehicles and in-real time monitors, from a strategic vantage point at a distance, various mechanical configurations. For instance, the mechanical configuration may include: extent of wing span, fuselage or wing structural drag coefficients, airfoil flow patterns, rudder movement, wing deflection, tail swinging and swaying, and aircraft takeoff, climb, and decent patterns. As such, an operator may substantially simultaneously observe and/or track physical, electrical, and motion characteristics of the aircraft without being subjected to external forces or dangers. Such external forces or dangers may cause an inadvertent crash due to operator error or mechanical failure or sudden unpredictable wind directional patterns that may result in tail spin conditions, which if not properly performed, may have undesirable results.

Figure 5:
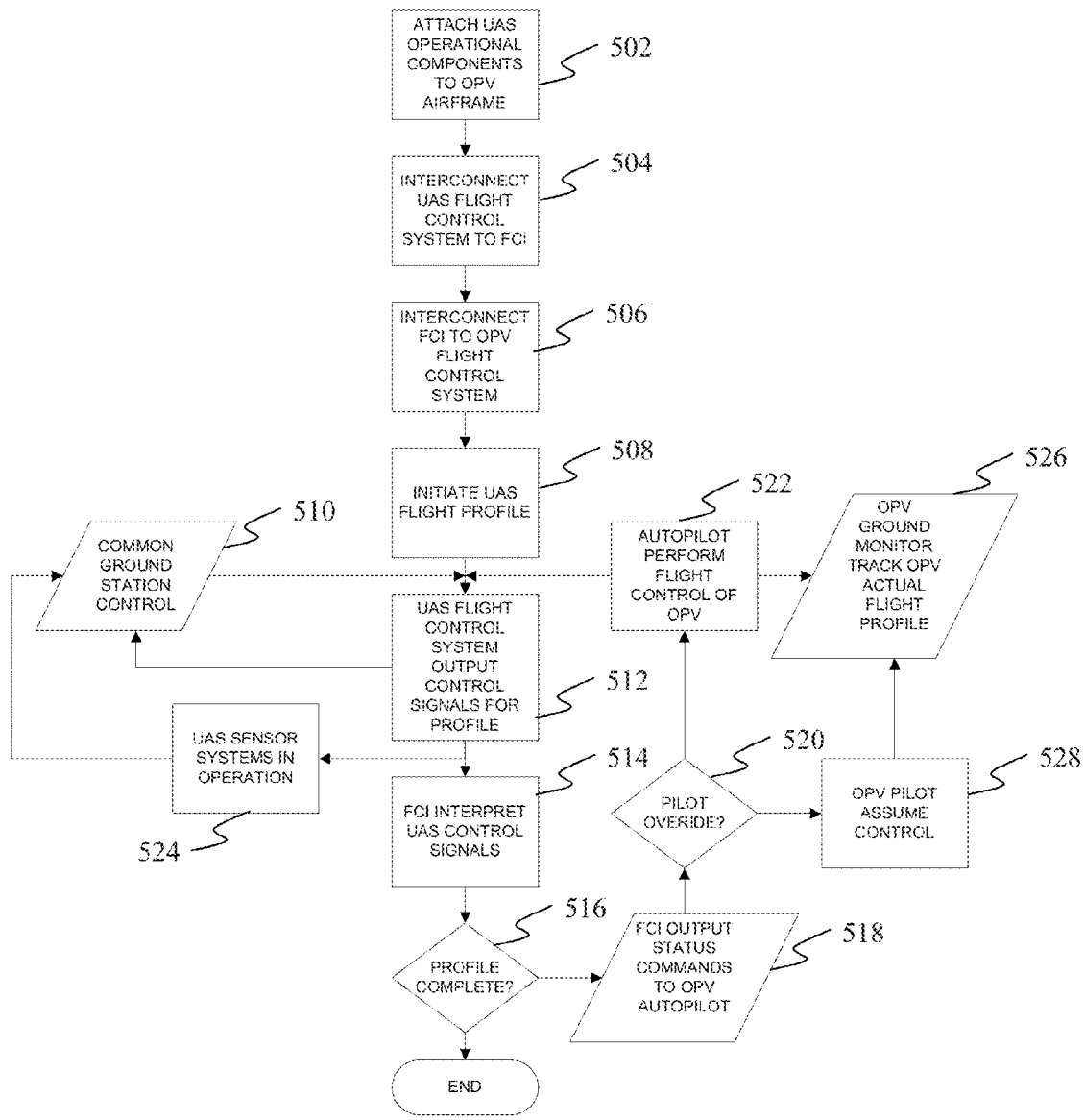
FIG. 5 is a flow chart of the method of operation of the embodiments described herein.

In operation the embodiments of the UAS $C^2$ test bed are employed as shown by the flowchart in FIG. 5. The UAS fuselage 10 with the operational components of the LAS flight control system and sensor system is attached to the OPV airframe 12, step 502. The UAS flight control system 16 is connected to the FCI 20, step 504 and the FCI is connected to the OPV flight control system 19 step 506. The flight profile for the UAS is then initiated, step 508. As previously described, the UAS flight profile may be preprogrammed. In other instances, control of the UAS flight profile may be conducted by an operator (e.g., certified aeronautics official or director) at the common ground station 18 and provide data 510 for the UAS flight control system. The UAS flight control system then provides output control signals for the commanded flight profile, step 512. The FCI 20 interprets the UAS control signals, step 514. As previously identified, the UAS control signals may include attitude data 22, vertical navigation data 24, lateral navigation data 26, turn rate data 28, velocity data 30, and engine operations data 32. If the flight profile is not yet complete, step 516, the FCI outputs status commands to the OPV autopilot 36, step 518. As previously identified, the status commands may include attitude 38, vertical navigation 40, lateral navigation 42, turn rate 44, velocity 46, and engine operations data 48. If no pilot override is present, step 520, the autopilot then performs flight control of the OP, step 522, corresponding to the status commands mimicking the profile which would be flown by the UAS in autonomous operation. During the flight, the UAS sensor systems 14 are in operation, step 524 providing data to the common ground station just as if the UAS were in autonomous operation. The OPV and its systems are "transparent" to the operator of the UAS at the common ground station. The OPV ground monitor 56 tracks the actual flight profile of the OPV providing corroborating data for actual flight performance, step 526. If at any time there is an emergency, safety of flight issue or other anomaly or contingency, the pilot override at step 520 can be exercised and the OPV pilot may assume direct control of the OPV, step 528, overriding the FCI output status commands.

Various functions of the UAS can be tested and verified while being flown with the OPV. As a first example commands for turning and pitching the OPV can be tested.

Figure 6:
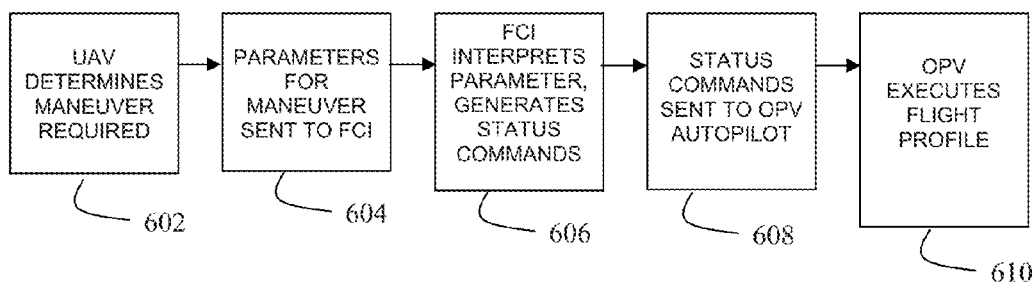
FIG. 6 is a flow chart that depicts the flow of commands and information between the UAS and the OPV in the embodiments of the system.

During its flights attached to the OPV, the UAS sends commands via the FCI to the OPV control law computer so it may turn, pitch and otherwise fly in a prescribed pattern. Input from either the common ground station or from the UAS's sensing package (i.e. data about attitude, vertical navigation, lateral navigation, turn rate, velocity, and engine operations) will allow the UAS to decide it must, for example, turn right. To turn right, it executes the following operation, as shown in FIG. 6 which depicts the flow of commands and information between the UAS and the OPV. First, the UAS determines through its six key control parameters for this embodiment that a maneuver (e.g. righthand turn) is required, step 602. It then sends the appropriate parameter data to the FCI, step 604, which generates status commands to change the current path of the OPV. These status commands are sent to the OPV, step 606, which then interprets the commands and executes a flight profile, step 608, which mimics or replicates the profile that would be executed by the UAS alone.

Figure 7:
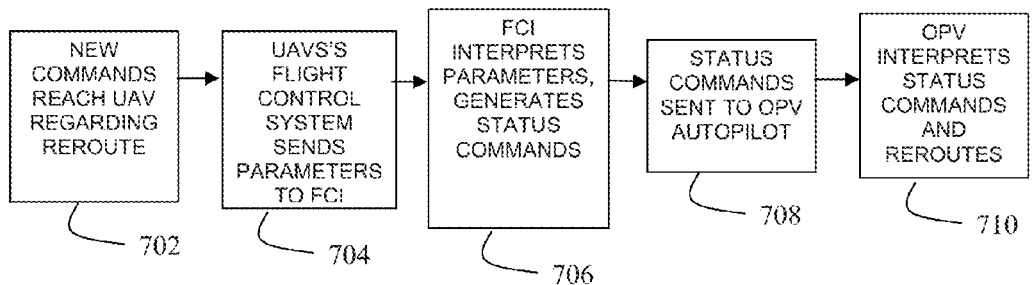
FIG. 7 is a flow chart that depicts the rerouting process the UAS would execute and then communicate to the OPV.

Rerouting to conform to commands from a common ground station provides a second example. The UAS will occasionally need to respond to rerouting commands from an external operator (not the pilot in the OPV). When these commands are received, they are then processed through a similar flow as shown in FIG. 6. FIG. 7 explains the rerouting process the UAS would execute and then communicate to the OPV. When new commands regarding a reroute are received by the UAS, step 702, the UAS's flight control system sends parameters to the FCI, step 704. The FCI interprets the commands and generates status commands for the OPV autopilot, step 706. The status commands are then sent to the autopilot, step 708, which interprets status commands and reroutes, step 710.

Figure 8:
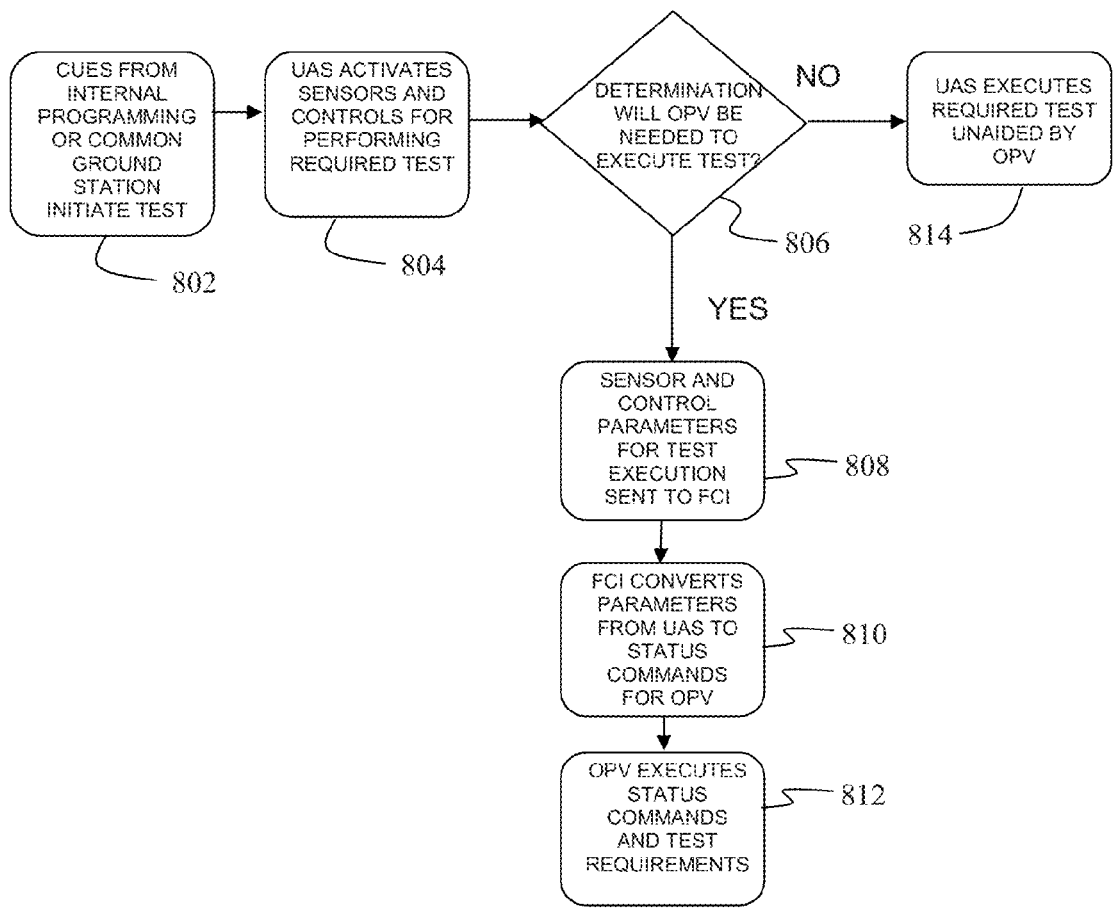
FIG. 8 is a flow chart that depicts testing and taking data samples on the UAS that may be accomplished during flight with the OM/.

As a third example, testing and taking data samples on the UAS may be accomplished during flight with the OPV. For flight certification, the UAS must perform and pass a number of safety and efficiency examinations. To execute some of these tests, it may require assistance from the OPV. Examples of this include takeoff and ascent capability assessment and fuel efficiency tracking. As shown in FIG. 8, initial cues are sent to the UAS (either from a Common Ground Station or pre-programmed commands) that it must execute a required test, step 802. The VAS activates its internal sensors and controls, step 804 and determines if the test requires the assistance/cooperation of the OPV, step 806. If so, parameters from the necessary sensors and controls are sent to the FCI, step 808, which then converts the information into status commands for the OPV, step 810. The OPV then executes the commands for the test, step 812.

Other data may not require intervention from the OPV for the LAS to complete its tests ("NO" arrow in FIG. 8) and the UAS then executes the required test unaided, step 814. An example of a non-OPV interaction test would be assessment of accurate airspeed. The UAS can have an airspeed sensor directly on it and does not require help/cooperation from the OPV.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A system for unmanned aircraft system (UAS) testing comprising:
    a UAS flight control system capable of autonomous operation of a UAS;
    an optionally piloted vehicle (OPV) having capability for a pilot on board the OPV and flight characteristics capable of mimicking a flight profile of the UAS attached to the UAS flight control system, said OPV having an OPV flight control system with an autopilot and a pilot override operable by the on board pilot; and,
    a flight control interpreter (FCI) receiving input of control parameters from the UAS flight control system representing a flight profile of the UAS, said FCI providing status commands as an output to the autopilot in the OPV flight control system to replicate the flight profile.

2. The system for UAS testing as defined in claim 1 wherein the autonomous UAS flight control system is integrated in at least a UAS fuselage attached to the OPV and further comprising UAS sensors.

3. The system for UAS testing as defined in claim 2 further comprising a common ground station for control of the UAS flight control system.

4. The system for UAS testing as defined in claim 3 wherein the common ground station receives data from the UAS sensors.

5. The system for UAS testing as defined in claim 1 wherein the control parameters are selected from the group consisting of attitude, vertical navigation, lateral navigation, turn rate, velocity and engine operations.

6. The system for UAS testing as defined in claim 5 wherein the status commands are selected from the group consisting of attitude, vertical navigation, lateral navigation, turn rate, velocity, and engine operations.

7. An unmanned aircraft system (UAS) Captive Carry test system comprising:
    at least a UAS fuselage having a UAS flight control system capable of autonomous operation of a UAS;
    an optionally piloted vehicle (OPV) with capability for a pilot on board the OPV having an OPV flight control system with an autopilot and a pilot override operable by the on board pilot, said OPV carrying the UAS fuselage and having flight characteristics capable of mimicking a flight profile of the UAS, and a flight control interpreter (FCI) receiving control parameters from the UAS flight control system, said FCI providing status commands to the OPV flight control system to replicate a UAS flight profile; and,
    an OPV ground monitor.

8. The UAS captive carry test system as defined in claim 7 further comprising a common ground station communicating with the UAS flight control system.

9. The UAS captive carry test system as defined in claim 8 further comprising UAS sensors incorporated in the UAS fuselage, said sensors in communication with the common ground station.

10. The UAS captive carry test system as defined in claim 7 wherein the control parameters are selected from the group consisting of attitude, vertical navigation, lateral navigation, turn rate, velocity and engine operations.

11. The UAS captive carry test system as defined in claim 10 wherein the status commands are selected from the group consisting of attitude, vertical navigation, lateral navigation, turn rate, velocity, and engine operations.

12. A method for testing of an unmanned aircraft system (UAS) in the national airspace (NAS) comprising:
    attaching at least a UAS fuselage having a UAS flight control system capable of autonomous operation of a UAS to an optionally piloted vehicle (OPV) having an OPV flight control system with an autopilot and pilot override for a pilot on board the OPV and flight characteristics capable of mimicking a flight profile of the UAS;
    interconnecting the UAS flight control system to a flight control interpreter (FCI);
    interconnecting the FCI to the OPV flight control system;
    initiating a UAS flight profile;
    providing control parameters from the UAS flight control system to the FCI;
    interpreting the control parameters in the FCI;
    determining if the profile is complete and, if not, outputting status commands from the FCI to the OPV control system;
    determining if there is an override by the on board pilot; and,
    controlling the OPV based on the status commands.

13. The method of claim 12 further comprising communicating with the UAS flight control system using a common ground station.

14. The method of claim 13 further comprising monitoring UAS sensor systems with the common ground station.

15. The method of claim 12 further comprising tracking an actual flight profile of the OPV with an OPV ground monitor.

16. The method of claim 12 further comprising asserting a pilot override by the on board pilot and said on board pilot assuming control of the OPV.

17. A method of controlling an optionally piloted vehicle (OPV) in national airspace comprising:

attaching an unmanned aircraft system (UAS) to an OPV having an autopilot, the capability for a pilot on board the OPV, and an override capability by the on board pilot;

receiving control parameters for a flight profile with a UAS flight control system capable of autonomous operation of a UAS; and, directing the control parameters to a flight control interpreter (FCI);

receiving status commands from the FCI in an OPV flight control system;

replacing the UAS flight profile with the autopilot in the OPV.

18. The method of claim 17 further comprising asserting a pilot override and assuming control of the OPV if an emergency or contingency arises.

* * * * *